United States Patent [19]

Helwig et al.

[11] Patent Number: 5,793,749
[45] Date of Patent: Aug. 11, 1998

[54] METHOD AND APPARATUS FOR COMMUNICATIONS TESTING USING A RECORDED TEST MESSAGE

[75] Inventors: Arthur Paul Helwig, Mesa; Glen Eugene Sater; John Richard Rezek, both of Phoenix, all of Ariz.

[73] Assignee: Motorola, Inc., Schaumburg, Ill.

[21] Appl. No.: 529,252

[22] Filed: Sep. 15, 1995

Related U.S. Application Data

[62] Division of Ser. No. 361,401, Dec. 22, 1994, abandoned.

[51] Int. Cl.$^6$ ..................................... H04B 1/52
[52] U.S. Cl. .................. 370/241; 370/296; 375/224; 455/67.4
[58] Field of Search .................. 370/242, 243, 370/276, 277, 294, 296, 241, 278, 279, 286, 252, 253; 375/219, 224, 295, 316; 371/3, 20.1, 20.4, 20.5, 21.1, 21.2; 455/67.4

[56] References Cited

U.S. PATENT DOCUMENTS

| | | | |
|---|---|---|---|
| 5,388,091 | 2/1995 | Kagawa | 370/296 |
| 5,432,775 | 7/1995 | Crayford | 370/296 |
| 5,450,618 | 9/1995 | Naddell et al. | 370/296 |
| 5,544,159 | 8/1996 | Ablay | 370/296 |
| 5,572,510 | 11/1996 | Koivu | 370/252 |

*Primary Examiner*—Chi H. Pham
*Assistant Examiner*—Ricky Q. Ngo
*Attorney, Agent, or Firm*—Frank J. Bogacz

[57] ABSTRACT

A communication system (10) includes a duplex digital communication node (14) and a half-duplex digital communication node (12). The half-duplex node (12) is configured to perform duplex testing. The half-duplex node (12) digitizes a test message (74), vocodes the test message (76), possibly encrypts the test message (78), FEC encodes the test message (80), assembles the test message into frames (82), and records the framed test message (84). During a duplex test mode of operation, the node (12) retrieves the test message (92) and transmits (90) it away from the node (12). During the duplex test mode, the node (12) also receives a signal, disassembles signal data from frames (114), FEC decodes the data (116), possibly decrypts the data (118), de-vocodes the data (120), and converts the resulting data stream into analog data (122).

9 Claims, 3 Drawing Sheets

METHOD AND APPARATUS FOR COMMUNICATIONS TESTING USING A RECORDED TEST MESSAGE

This is a division of application Ser. No. 08/361,401, filed Dec. 22, 1994 now abandoned.

TECHNICAL FIELD OF THE INVENTION

The present invention relates generally to the testing of communication devices. More specifically, the present invention relates to half-duplex communication nodes which are capable of operating in a full-duplex test mode.

BACKGROUND OF THE INVENTION

Communication systems may operate in one or both of full-duplex and half-duplex modes. In a full-duplex mode, hereinafter referred to as a duplex mode, communications may take place in two directions simultaneously. In other words, devices operating in duplex modes may transmit and receive at the same time. In a half-duplex mode, a device may either transmit or receive, but cannot do both at the same time. The duplex mode has advantages in that it supports more natural communications and it permits more flexible signaling arrangements. However, the duplex mode is achieved at the cost of additional spectrum requirements. In addition, communication node circuits must be capable of simultaneously performing transmit and receive functions.

In digital communication systems, transmitted signals are often compressed, encrypted, and/or encoded for error detection and correction. Likewise, received signals are often decoded, decrypted, and/or decompressed. These functions are conveniently and reliably performed within digital signal processing devices, such as digital signal processors (DSPs). Unfortunately, when a digital communication device operates in a duplex mode, it requires sufficient processing power to simultaneously perform both transmit and receive functions. In voice communication systems where signals are compressed through vocoding and decompressed through de-vocoding, the extensive signal processing requirements imposed by duplex communication often force the inclusion of separate DSPs and support circuits for transmit and receive paths. Thus, the duplex device imposes penalties in complexity, power consumption, hardware space requirements, and cost when compared to a half-duplex device.

For digital communication systems, significant advantages may be achieved by configuring communication nodes as half-duplex devices, which do not suffer the penalties associated with duplex devices. Even when a system may accommodate duplex communication, certain communication nodes can nevertheless operate satisfactorily in only a half-duplex mode to forego the duplex penalties. Such devices may include test equipment and lower cost performance nodes.

While the half-duplex mode is sufficient for many tests, a full testing capability in a duplex system advantageously includes an ability to stimulate duplex operation in other nodes. Accordingly, a need exists for a communication node which does not experience the duplex penalties, but nevertheless stimulates duplex operation in other nodes.

SUMMARY OF THE INVENTION

Accordingly it is an advantage of the present invention that an improved method and apparatus for communications testing using a recorded test message are provided.

Another advantage is that the present invention provides a half-duplex communication node which performs duplex testing.

Another advantage is that the present invention performs a sophisticated pre-transmit process to record a test message when not operating in a half-duplex receive mode, then later performs a simple final transmit process using the recorded test message while simultaneously performing a sophisticated receive process. Duplex testing can thus be performed.

The above and other advantages of the present invention are carried out in one form by a method for testing a communication apparatus. The method calls for recording a test message at a communication node. The test message is transmitted from the communication node. A signal is received at the communication node during the transmission of the test message.

Additionally, the present invention is carried out by an apparatus for a half-duplex communication node which includes a digital signal processor. The communication node also has a data storage memory which is coupled to the digital signal processor for recording a test message. A transmitter, coupled to the digital signal processor, for transmitting the test message recorded in the data storage memory. The communication node also has a receiver which is coupled to the digital signal processor for receiving a signal while the transmitter is transmitting the test message.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
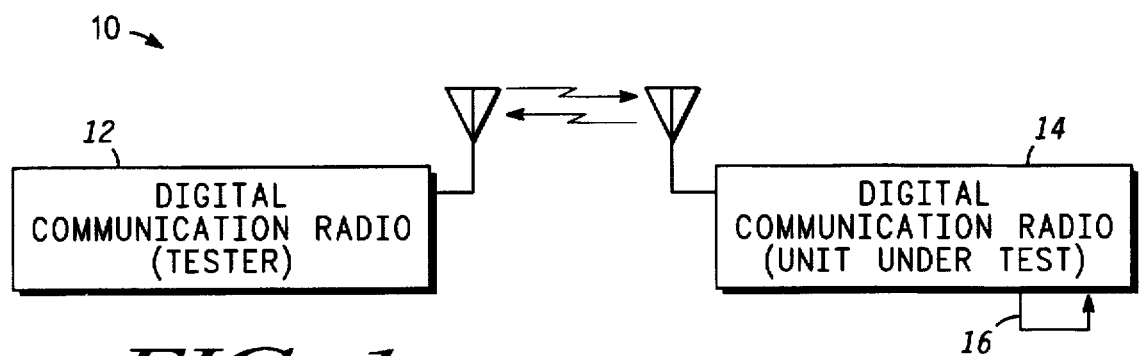
FIG. 1 shows a block diagram of a communication system in which the present invention may be practiced.

FIG. 1 shows a block diagram of a communication system 10 in which the present invention may be practiced. System 10 includes a communication node 12, which has the role of being a tester for the purposes of the present invention, and a communication node 14, which has the role of being a unit under test. System 10 may include any number of other communication nodes as well, and such other nodes may reside between nodes 12 and 14 in system 10. In the preferred embodiments, communication nodes 12 and 14 may be digital communication radios. In other words, nodes 12 and 14 communicate digital data through RF signals. Node 12 may be dedicated test equipment, such as a service monitor, or may be a subscriber unit, base station, or the like. Node 14 may be a base station or a subscriber unit. However, nothing prevents system 10 from including or coupling to a wireline public switched telecommunications network (PSTN) so that nodes 12 and/or 14 may engage in wireline communications in addition to or in lieu of RF communications.

For the purposes of the present invention, node 14 is a full-duplex, or duplex, node while node 12 is a half-duplex node which can operate in a duplex testing mode. A loop back link 16 at node 14 loops an output signal from node 14 back to an input of node 14. With the aid of loop back link 16, tester node 12 may transmit a signal which unit under test node 14 receives and simultaneously transmits back to tester node 14. Those skilled in the art will appreciate that such loop back testing is an efficient and effective technique for verifying that circuits and communication paths between nodes 12 and 14 are operating properly.

Figure 2:
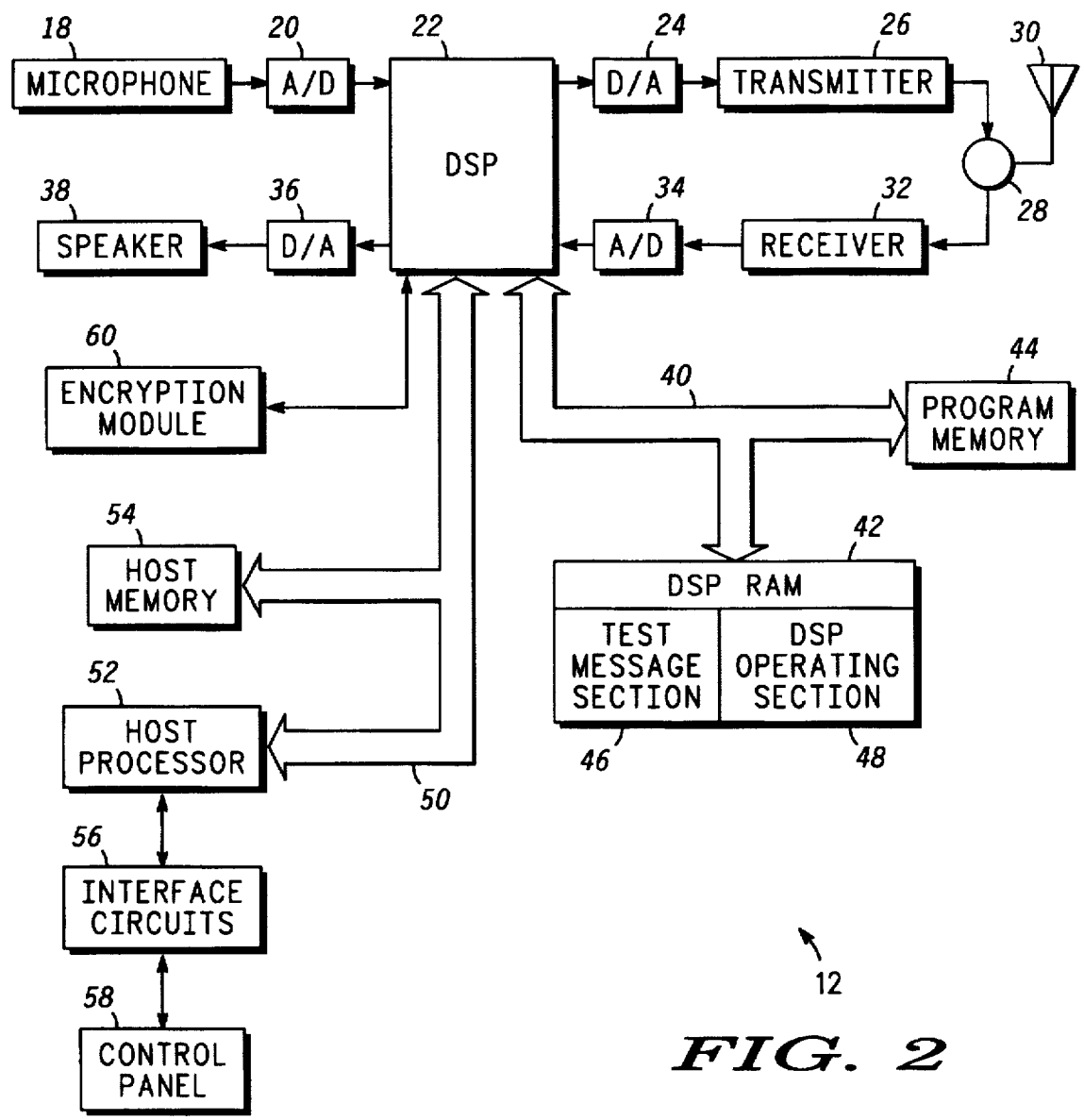
FIG. 2 shows a block diagram of a communication node configured in accordance with the teaching of the present invention.

FIG. 2 shows a block diagram of a preferred embodiment of communication node 12 (see FIG. 1). Node 12 includes a microphone 18 which converts acoustic audio signals into analog audio electronic signals. Microphone 18 couples to an analog to digital (A/D) converter 20 through various conventional signal conditioning circuits (not shown). A/D converter 20 digitizes the analog signals to produce a digital audio electronic signal or data stream. A/D converter 20 couples to a signal input of a digital signal processor (DSP) 22. In the preferred embodiments, DSP 22 is a conventional digital signal processor, such as a DSP 56001 manufactured by Motorola, Inc.

An output of DSP 22 provides a transmission data stream and couples to a digital to analog (D/A) converter 24. In the preferred embodiment, this data stream is compatible with a standard QPSK data transmission protocol. D/A 24 converts the transmission data stream into an analog form, and couples to an input of a transmitter 26. Transmitter 26 includes conventional digital transmission circuits, such as a frequency modulator, up-converter, power amplifier, and the like (not shown). An RF output of transmitter 26 couples through a combining circuit 28 to an antenna 30, where an RF signal radiates away from node 12.

Antenna 30 couples through combining circuit 28 to an RF input of a receiver 32. Receiver 32 includes conventional receiver circuits, such as an RF amplifier, down-converter, FM demodulator, and the like (not shown). Receiver 32 processes an RF signal received at antenna 30 into a baseband signal. Receiver 32 couples to an input of an A/D converter 34 that has an output which couples to an input of DSP 22. A/D 34 converts this baseband signal into a baseband data stream. DSP 22 processes the baseband data stream into a digital audio data stream. An output of DSP 22 couples to an input of a D/A converter 36, which converts the digital audio data stream into an analog audio signal. An output of D/A converter 36 couples to a speaker 38 through various processing and amplifying circuits (not shown) to convert the analog audio signal into an acoustic form which may be heard by a user of node 12. FIG. 2 shows separate transmit and receive signal data stream paths through DSP 22 for the sake of clarity. However, those skilled in the art will understand that DSP 22 may use one or more paths to accommodate the transmit and receive signals.

DSP 22 couples through an address, data, and control bus 40 to a DSP random access memory (RAM) 42 and to a program memory 44. In the preferred embodiments, RAM 42 provides volatile storage and program memory 44 provides non-volatile storage. RAM 42 is configured, at least logically, into a test message section or buffer 46 and a DSP operating section or buffer 48. DSP 22 stores a digitized test message in test message section 46. This test message, its storage, and its retrieval are discussed below in connection with FIGS. 3 and 4. DSP 22 uses operating section 48 for conventional DSP operational data storage, such as variable, table, array, and database storage. Program memory 44 stores programming instructions which cause DSP 22 to carry out tasks, processes, procedures, and the like which allow it to process transmit and receive signals. The portion of these tasks, processes, and procedures which relate to the present invention are discussed below in connection with FIGS. 3 and 4. A test message can alternatively be stored in an Erasable Programmable Read Only Memory (EPROM) instead of DSP RAM 42, the test message section 46, which is accessed by DSP 22. In this case the test message is captured and stored prior to manufacture of the communication node device. Therefore, such a test message is not changeable by the user.

DSP 22 couples through an address, data, and control bus 50 to a host processor 52. Host processor 52 represents a conventional microprocessor, micro controller, or the like, and DSP 22 represents one item in the address space for host processor 52. Bus 50 additionally couples to a host memory 54. Host memory 54 provides both program storage and data storage for host processor 52. Memory 54 may include both volatile and non-volatile memory.

Host processor 52 additionally couples to interface circuits 56, which connect host processor 52 to a control panel 58. In the preferred embodiment, interface circuits 56 include a dual port RAM and a main system computer. However, this level of complexity is imposed by features of the preferred embodiment of node 12 which are unrelated to the present invention and may be omitted in other applications. Regardless of the nature of interface circuits 56, host processor 52 receives data from control panel 58 and controls DSP 22 in response to these data. The data received from control panel 58 include user commands. For example, control panel 58 may include buttons, keys, or switches, and these input devices may be manipulated by a user to instruct node 12 to record a test message, to operate in a half-duplex mode, to operate in a duplex test mode, and/or other actions.

DSP 22 additionally couples to an encryption module 60 which is used in encrypting and decrypting digital data flowing through DSP 22.

Figure 3:
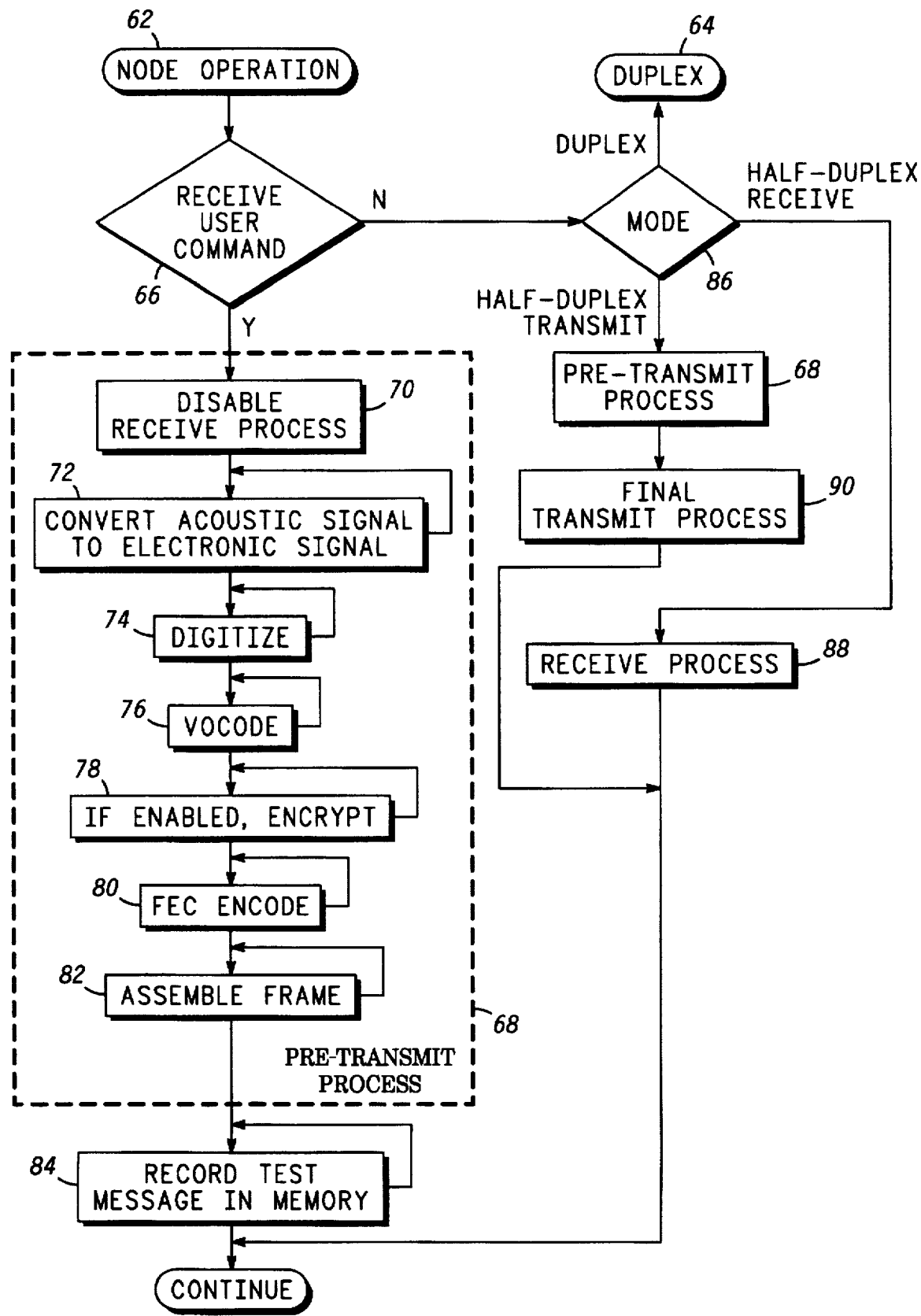
FIG. 3 shows a flow chart of a node operation procedure performed by the communication node.
Figure 4:
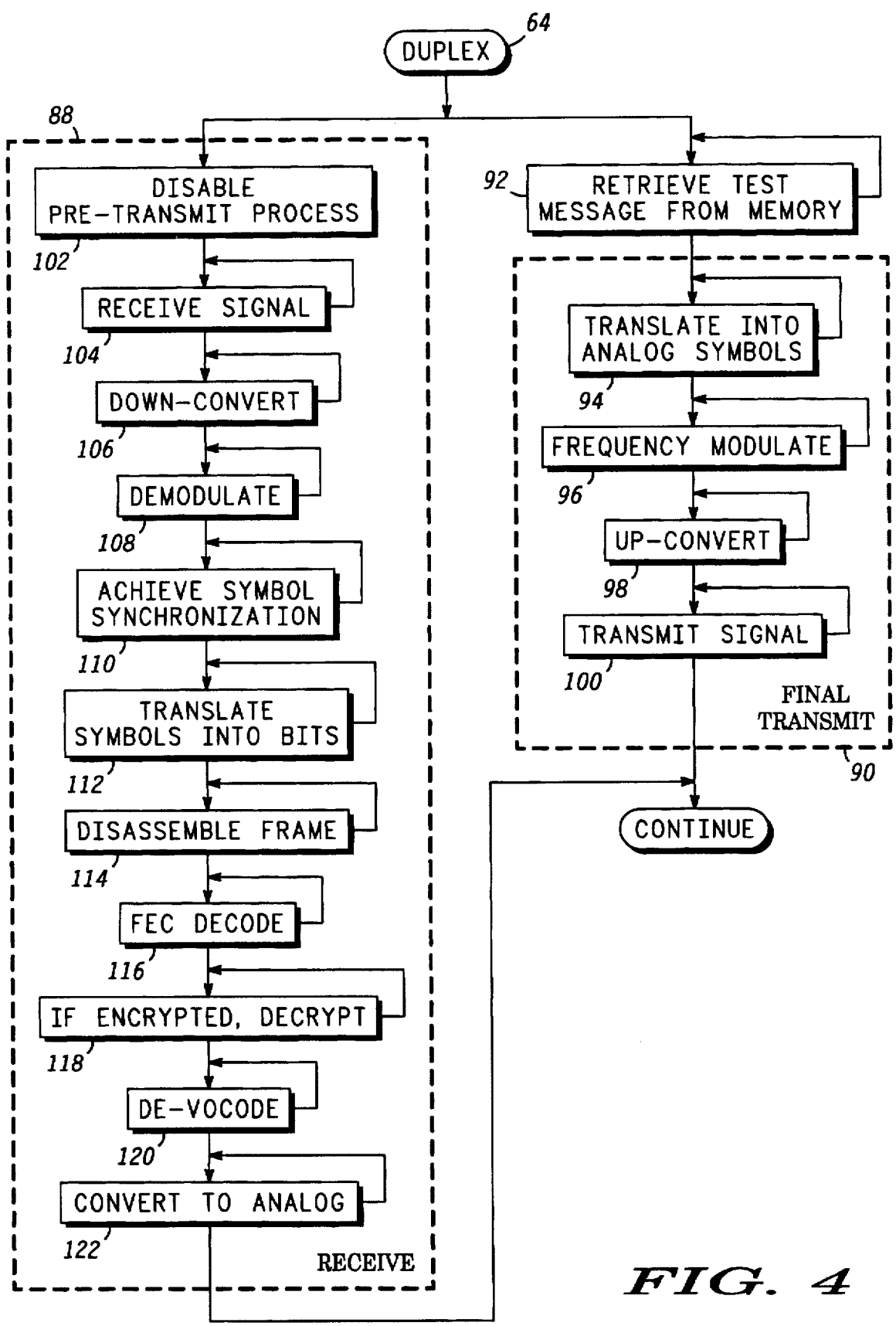
FIG. 4 shows a flow chart of a duplex process performed by the communication node.

FIG. 3 shows a flow chart of a node operation procedure 62 performed by node 12. FIG. 4 shows a flow chart of a duplex process 64 which is performed by node 12 and which forms a part of procedure 62. Those skilled in the art will appreciate that node 12 may perform tasks, processes, and procedures other than those discussed in connection with FIGS. 3 and 4, but that such tasks, processes, and procedures are conventional in nature and not concerned with the present invention. Such additional tasks, processes, and procedures may include a power-on initialization process, a handler for user input obtained from control panel 58 (see FIG. 2), a process for automatically determining whether current transmit and receive signal conditions accommodate operating in a half-duplex transmit mode or a half-duplex receive mode, an idle loop, and the like. Moreover, those skilled in the art will appreciate that node 12 will perform procedure 62 in response to programming instructions which are configured to implement program flow similar to that shown in FIGS. 3 and 4 and which are stored in program memory 44 and host memory 54.

With reference to FIGS. 2 and 3, procedure 62 performs a query task 66 which determines whether a user command instructing node 12 to record a test message has been received. Such a command may be received from control panel 58. When this command is received, procedure 62 performs a pre-transmit process 68. Pre-transmit process 68 generally performs the substantial amount of the DSP processing which is required before a signal may be transmitted from node 12. This processing is applied to a real time message obtained from microphone 18. However, pre-transmit process 68 does not include tasks which actually cause node 12 to transmit the real time message. Pre-transmit process 68 is performed both when a user command is received which instructs the recording of a test message and when node 12 operates in a half-duplex transmit mode.

Pre-transmit process 68 includes a task 70 which disables a receive process, discussed below. Task 70 takes whatever actions are needed, if any, to insure that DSP 22 will refrain from using its processing or computational power to process any baseband digital stream obtained from receiver 32. Although not shown in FIG. 3, task 70 may additionally take whatever actions are needed, if any, to insure that node 12 does not perform a final transmit process, discussed below, at least when pre-transmit process 68 is being performed to record a test message. This prevents the test message from being transmitted.

After task 70, a task 72 converts an acoustic audio message into an electronic signal. Microphone 18 is involved in performing task 72. When pre-transmit process 68 is being performed to record a test message, the audio message is considered to be the test message, but when pretransmit process 68 is being performed while node 12 operates in a half-duplex transmit mode the message is considered to be a real time message.

FIG. 3 illustrates program flow as exiting from task 72 to proceed both back to task 72 and to a new task 74. A similar notation is applied to many tasks shown in FIGS. 3 and 4. This notation showing program flow both remaining at a task and proceeding to a next task denotes a pipelining operation which may, but need not, be applied in processing a transmit or receive signal. After a small time segment of a signal is processed by a first task, a second task may then apply its processing to that same time segment of the signal. While the second task is processing the previous signal segment, the processing of the first task may be applied to the next small time segment of the signal. Thus, in any one time segment, all required processing tasks are completed, but each task operates on different signal segments. Likewise, for each signal segment, all required processing tasks are eventually performed, but they may take place over several time segments.

After task 72 converts an acoustic signal into an electronic signal, task 74 involves A/D converter 20 in digitizing the audio analog electronic signal into a digital audio electronic data stream which digitally characterizes the audio message.

Next, a task 76 vocodes, or compresses, this digital data stream within DSP 22. Task 76 in the preferred embodiments uses conventional linear predictive coding (LPC) techniques to vocode the data stream so that substantially all the information content of the message may be represented using fewer data bits and may be transmitted using a smaller bandwidth than would be required to transmit the unvocoded data stream. Those skilled in the art will appreciate that the vocoding in task 76 is a computationally intensive task which consumes a significant amount of the processing time or power of DSP 22.

After task 76, a task 78 determines whether encryption is to be applied to the vocoded message, and task 78 performs the encryption if encryption is enabled. Task 78 may be performed with the aid of DSP 22 and encryption module 60. Prior user or other inputs (not shown) may instruct node 12 whether to apply encryption. Next, a task 80 generates forward error correction (FEC) data which are added to and form a portion of the vocoded and possibly encrypted message. FEC encoding task 80 is performed in DSP 22. After adding FEC encoding, a task 82 assembles the data stream into frames which are compatible with the transmission protocol, and program control then exits pre-transmit process 68. Task 82 is also performed by DSP 22.

Upon exiting pre-transmit process 68 when a test message is to be recorded, a task 84 records the vocoded, possibly encrypted, FEC encoded, framed test message in test message section 46 of memory 42. In the preferred embodiment, test memory section 46 is sufficiently large to accommodate a test message of 5–20 seconds in duration. After task 84, program control continues with other tasks, such as an idle loop, which will eventually cause program control to return to node operation procedure 62. Thus, a substantial amount of the digital signal processing which is required to prepare an audio test message for transmission is performed while node 12 is not processing an incoming signal. Consequently, sufficient DSP processing power is. available to perform pre-transmit process 68.

Referring back to task 66, when no user command to record a test message is detected, a query task 86 switches program flow to accommodate the current mode of operating node 12. For the purposes of the present invention, node 12 operates in a duplex test mode, a half-duplex transmit mode, and a half-duplex receive mode. During the duplex test mode, node 12 transmits its previously recorded test message while simultaneously processing a received signal. In the half-duplex transmit mode, node 12 digitally processes and transmits a real time message obtained at microphone 18 without performing receive signal processing. During the half-duplex receive mode, node 12 receives and digitally processes a signal and presents it at speaker 38 without performing transmit signal processing. Node 12 may operate in its duplex test mode when instructed to do so by user input presented at control panel 58. Node 12 may operate in the half-duplex modes as instructed from control panel 58 or automatically switch therebetween as needed to accommodate current conversation dynamics.

When task 86 determines that node 12 is operating in its duplex test mode, duplex process 64 is performed. Duplex process 64 is discussed in connection with FIG. 4. Referring to FIGS. 2 and 4, process 64 causes node 12 to perform a receive process 88 while it concurrently retrieves the test message from memory 42 and performs a final transmit process 90. Those skilled in the art will appreciate that parallel processes and tasks may be performed by allocating brief time segments to each of the parallel processes and tasks and rapidly sequencing through the parallel processes and tasks.

In particular, process 64 includes a task 92 in which DSP 22 retrieves the test message from test message section 46 of memory 42. The retrieved test message is the one that has been previously digitized, vocoded, possibly encrypted, FEC encoded, assembled into frames, and recorded into memory 42 as discussed above in connection with FIG. 3.

After task 92 retrieves the test message, node 12 performs final transmit process 90. Generally, node 12 performs final transmit process 90 during both the duplex test mode and the half-duplex transmit mode. Final transmit process 90 performs the final stage of signal processing required for a signal being transmitted away from node 12. Only an insignificant amount of processing time or computational power is required of DSP 22. During the duplex test mode, final transmit process 90 operates upon the prerecorded test message, but during the half-duplex transmit mode final transmit process 90 operates upon the real time message currently being obtained from microphone 18. If a continuous test is required, the pre-recorded test message can be automatically cycled to provide a continuous test message.

This cycling reduces the amount of memory required to store long test messages.

Final transmit process 90 includes a task 94 which translates the bits from the framed message into analog symbols. Task 94 is performed both by DSP 22 and D/A 24. The computational power required by DSP 22 during task 94 amounts to little more than moving and partitioning the data into two-bit symbols which are compatible with the QPSK protocol followed by the preferred embodiment of the present invention.

After task 94, a task 96 frequency modulates the analog symbols, a task 98 up-converts the frequency modulated symbols, and a task 100 transmits the up-converted signal away from node 12. Tasks 96 and 98 are performed by transmitter 26, and task 100 is performed by transmitter 26 and antenna 30.

Also during the duplex test mode, node 12 performs receive process 88. However, receive process 88 is performed both during the duplex test mode and the halfduplex receive mode. In either mode, receive process 88 operates upon a signal received at antenna 30 and receiver 32. Receive process 88 performs a task 102 to take whatever actions are needed, if any, to disable pre-transmit process 68 (see FIG. 3). Task 102 insures that DSP 22 will refrain from using its processing time or computational power to process any real time audio signal obtainable from microphone 18.

After task 102, a task 104 receives a signal at antenna 30 and receiver 32. Next, a task 106 down-converts the received signal to baseband, and a task 108 demodulates the signal to retrieve data symbols from it. Tasks 106 and 108 are performed by receiver 32. After task 108, a task 110 achieves symbol and frame synchronization, primarily through the expenditure of processing power by DSP 22. Next, in a task 112 DSP 22 translates received symbols into data bits, and in a task 114 DSP 22 disassembles communicated frame of data. After task 114, a task 116 causes DSP 22 to perform a computationally intense task of FEC decoding. Those skilled in the art will appreciate that task 116 complements task 80 (see FIG. 3). Thus, FEC decoding task 116 compensates for FEC encoding that may have been applied by a node communicating with node 12. After task 116, DSP 22 performs a task 118. In task 118, DSP 22 determines whether the received signal has been encrypted, and DSP 22 operates in conjunction with encryption module 60 to decrypt the signal if required.

After task 118, a task 120 causes DSP 22 to perform a computationally intensive task of de-vocoding, or decompressing, the received data stream. Task 120 is a complementary operation to vocoding task 76 (see FIG. 3) and desirably uses conventional Linear Predictive Coding (LPC) techniques. After task 120 de-vocodes the received data stream, a task 122 converts the de-vocoded data stream into an analog signal using D/A 36, after which it may be presented as an acoustic message which may be heard from speaker 38 by a user of node 12. After task 122, program control exits receive process 88. The above-discussed tasks and processes continue as long as node 12 remains in its duplex test mode. When a user input or other signal instructs node 12 to exit the duplex test mode, program control exits from processes 88 and 90 and from task 92. Upon exit, program control continues with other tasks, such as an idle loop, which eventually causes program control to return to node operation procedure 62 (see FIG. 3).

Accordingly, during the duplex test mode, node 12 transmits a test message using only an insignificant amount of DSP processing power while concurrently using a significant amount of DSP processing power to process a receive signal.

Referring back to FIG. 3, when task 86 determines that node 12 should operate in its half-duplex receive mode, node 12 performs receive process 88. During receive process 88, pre-transmit process 68 is disabled, and final transmit process 90 may be disabled as well (not shown). Program control remains in receive process 88 until some event causes node 12 to exit the half-duplex receive mode. This event may be initiated by user input or by automatic procedures which detect silence in the received signal and/or non-silence from microphone 18. Upon exit, program control continues with other tasks, such as the idle loop, which eventually causes program control to return to node operation procedure 62.

When task 86 determines that node 12 should operate in its half-duplex transmit mode, node 12 performs pre-transmit process 68 together with final transmit process 90. Receive process 88 is disabled so that the full processing power of DSP 22 may be dedicated to processes 68 and 90. Pre-transmit process 68 digitizes a real time message obtained from microphone 18, vocodes the message, possibly encrypts the message, FEC encodes the message, and assembles the message into frames. Final transmit process 90 translates the framed message into symbols and transmits the message away from node 12. Any test messages recorded in test message section 46 of memory 42 are ignored. Program control remains in pre-transmit process 68 and final transmit process 90 until some event causes node 12 to exit the half-duplex transmit mode. This event may be initiated by user input or by automatic procedures which detect nonsilence in the received signal and/or silence from microphone 18. Upon exit, program control continues with other tasks, such as the idle loop, which eventually cause program control to return to node operation procedure 62.

In summary, the present invention provides an improved method and apparatus for communications testing using a recorded test message. The present invention provides a half-duplex communication node which nevertheless performs duplex testing. A sophisticated and computationally intensive pre-transmit process records a test message when the node does not operate in a half-duplex receive mode. Later, the node performs a simple final transmit process using the recorded test message while simultaneously performing a sophisticated and computationally intensive receive process.

The present invention has been described above with reference to preferred embodiments. However, those skilled in the art will recognize that changes and modifications may be made in these preferred embodiments without departing from the scope of the present invention. For example, those skilled in the art may arrange processes, tasks, and procedures differently than described herein while achieving equivalent results. These and other changes and modifications which are obvious to those skilled in the art are intended to be included within the scope of the present invention.

What is claimed is:

1. A method for operating a half-duplex digital communication node to perform a duplex test, said method comprising the steps of:

obtaining a digitized audio test message;

vocoding said digitized audio test message to generate a vocoded test message;

recording said vocoded test message to form a recorded test message;

said obtaining and vocoding steps occur during said recording step, transmitting said recorded test message;

receiving a signal during said transmitting step;

de-vocoding said signal received during said receiving step; and said steps of obtaining, vocoding, recording, transmitting, receiving and de-vocoding being performed by said half-duplex digital communication node.

2. A method as claimed in claim 1 additionally comprising the steps of:

encoding said vocoded test message to generate forward error correction data which form a portion of said recorded test message; and decoding said signal received during said receiving step to compensate for said encoding step, said decoding step occurring during said receiving step.

3. A method as claimed in claim 1 additionally comprising the step of converting an acoustic audio test message into said digitized audio test message during said recording step.

4. A method as claimed in claim 1 additionally comprising the step of performing said transmitting, receiving, and de-vocoding steps after completion of said recording step.

5. A method as claimed in claim 1 wherein:

said recording step continues for a predetermined duration; and said transmitting step comprises the step of repeating said recorded test message when said transmitting and receiving steps continue longer than said predetermined duration.

6. A half-duplex communication node comprising:

a digital signal processor;

a data storage memory, coupled to said digital signal processor, for recording a test message;

a transmitter, coupled to said digital signal processor, for transmitting said test message recorded in said data storage memory;

a receiver, coupled to said digital signal processor, for receiving a signal while said transmitter is transmitting said test message; and a program memory, coupled to said digital signal processor, for storing programming instructions which cause said digital signal processor to obtain and vocode an audio signal to generate said test message, and to record said test message in said data storage memory.

7. A half-duplex communication node as claimed in claim 6 wherein said program memory additionally stores programming instructions which cause said digital signal processor to retrieve said test message from said data storage memory and to drive said transmitter with said retrieved test message while de-vocoding said signal received at said receiver.

8. A half-duplex communication node as claimed in claim 7 wherein said program memory additionally stores programming instructions which cause said digital signal processor to generate and include forward error correction data with said recorded test message and to decode said received signal to compensate for said forward error correction data.

9. A half-duplex communication node as claimed in claim 6 additionally comprising:

a control panel from which user commands are obtained, said control panel being coupled to said digital signal processor; and a program memory, coupled to said digital signal processor, for storing programming instructions which, in response to a user command that instructs said communication node to record said test message, causes said digital signal processor to obtain an audio signal, to generate said test message, and to record said test message in said data storage memory.

\* \* \* \* \*